United States Patent [19]

Snarr

[11] 4,244,103
[45] Jan. 13, 1981

[54] MOWER OF THE CENTRIFUGAL CORD TYPE WITH AUTOMATIC PAYOUT OF CUTTING CORD

[76] Inventor: James L. Snarr, 1747 SE. 44th Ter., Cape Coral, Fla. 33904

[21] Appl. No.: 875,122

[22] Filed: Feb. 3, 1978

[51] Int. Cl.³ ............................................ A01D 50/00
[52] U.S. Cl. ........................................ 30/276; 56/12.7
[58] Field of Search .................. 30/276, 347; 56/12.7, 56/295

[56] References Cited

U.S. PATENT DOCUMENTS 4,104,796  8/1978  Sheldon ............................... 30/276

Primary Examiner—Jimmy C. Peters
Attorney, Agent, or Firm—Harold S. Meyer

[57] ABSTRACT

A mower of the centrifugal cord type is provided with an automatic adjustment of the length of cutting cord, in which the centrifugal force of the rapidly whirling cord end acts on an arm which snubs the cord and prevents further cord from being paid out, until the wearing away of the cord end reduces the force and permits further cord to be paid out by the centrifugal force until the force again reaches the critical value for snubbing the cord.

10 Claims, 7 Drawing Figures

MOWER OF THE CENTRIFUGAL CORD TYPE WITH AUTOMATIC PAYOUT OF CUTTING CORD

BACKGROUND

In recent years mowers and weed trimmers of the whirling cutter type, in which the cutter consists of a strong flexible cord held taut by its centrifugal force, have become popular because they essentially eliminate the hazard of serious injury from contact with a whirling rigid blade with a sharp edge.

Such mowers are typically provided with a reel of cord from which the free end is drawn to a prescribed distance from the axis, and the cord is then clamped. After the free end is worn away by use, the machine is stopped so that the cord can be unclamped, drawn out again to the prescribed length, and reclamped.

OBJECT OF THE INVENTION

The object of the invention is to provide a mower of the whirling cord type in which the cord is automatically paid out from a supply reel until the desired optimum free length is attained and then is automatically clamped until the cord is shortened by wear, when additional cord is automatically paid out to restore optimum operating conditions.

A further object is to eliminate any need for stopping the motor and soiling the hands for adjustment of the machine.

SUMMARY OF THE INVENTION

In this invention the cutting cord in a long length is stored in the machine, preferably coiled in the groove of an inwardly facing channel of the flywheel or of an annular supply package which can be snapped into the rim of the flywheel.

The end of the cutting cord is drawn inward from the annular supply and passes through a snubbing device consisting of an element fixed to the rotating head of the machine and a movable element for clamping the cord. The cord is looped around the movable element which is preferably a freely rotating grooved pulley mounted for very slight motion toward and away from the fixed element which is preferably faced with a high friction material. The free end of the cord then passes out through an eye in the periphery of the cover of the rotating head.

The whirling cord mowers operate at a high rotational speed, of the order of 3600 RPM which is 60 revolutions per second, permitting the use of a simple two-pole induction motor operating at a constant nearly synchronous speed. At such a speed, even a very light element such as the nylon single filament cord of about 2 mm diameter generally used in whirling cord mowers exerts a substantial centrifugal force which may be somewhat more than a kilogram.

Since centrifugal force of each portion of a radial object at a particular rate of rotation is proportional to distance of that portion from the center of rotation, loss of the very end of the cord results in a substantial reduction in force, and loss of only one fourth of the length from the tip to the center of rotation reduces the centrifugal force by about a half.

The machine is therefore very sensitive to loss of a small part of the whirling cord, and is easily adjusted to release its grip on the cord when only a small part of the end is worn away. The remaining centrifugal force can then be made to draw out an added increment of length of cord until the increased centrifugal force again grips the cord in the snubbing device.

It is preferred to increase the sensitivity of the machine by providing a small constant force on the movable part of the snubbing device for partly counteracting the centrifugal force of the end of the cord. Such an arrangement exerting only a part of the pull required to overcome the snubbing effect will significantly increase the precision of operation by minimizing the difference between maximum and minimum lengths of cord during continuous use of the mower.

The constant counteracting or opposing force can be exerted very simply by a suitably located small spring with a force of a part of that required to overcome the centrifugal force of the cord at its optimum operating length such as one-third or one-half of that equivalent to the centrifugal force. The exact strength of the spring will, of course, depend where it is located and on the lever arm on which it acts.

Alternatively, a counteracting force is easily provided by shaping the lever arm on which the movable part of the snubbing device swings, so that it is not exactly symmetrically radial, with the resulting centrifugal force tending to swing the snubbing device in the desired direction.

In addition, if acceleration and deceleration during starting and stopping are found to produce unwanted extension or retraction forces on the cord, inertia brakes are provided in a very simple manner to minimize such problems.

THE DRAWINGS

In the accompanying drawings.

DETAILED DESCRIPTION

Figures 1, 2:
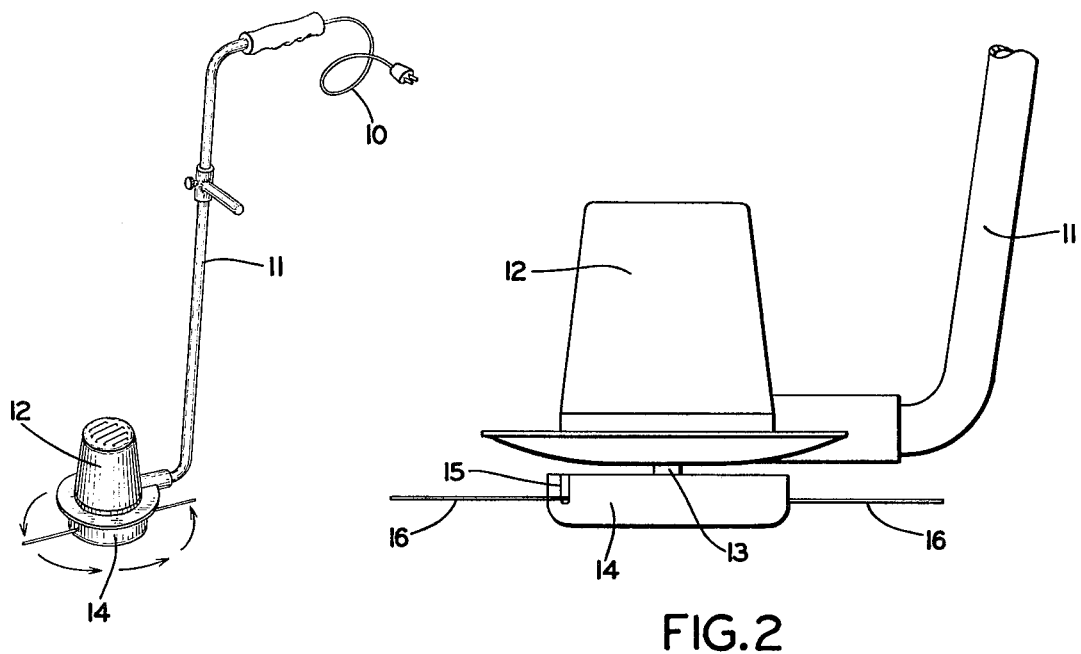
FIG. 1 is a small scale representation of a typical whirling cord mower which incorporates the cord length adjusting mechanism of this invention.
FIG. 2 is a side view of the cutting head on a somewhat larger scale.

Referring to FIG. 1, whirling cord mowers or weed cutters typically are powered by electric motors and consequently are provided with an electric cord 10 and a handle 11 of convenient length and shape for ease of manipulation of the actual mower near the surface of the ground.

A motor housing 12 contains a high speed motor with a vertical shaft 13 visible in FIG. 2. At the lower end of the shaft is a mower head, which may be hidden by a safety shield 14 having one or more openings 15 through which passes the cutting cord 16, the tip of which extends several inches beyond the safety shield 14 for the cord supply mechanism.

Figure 3:
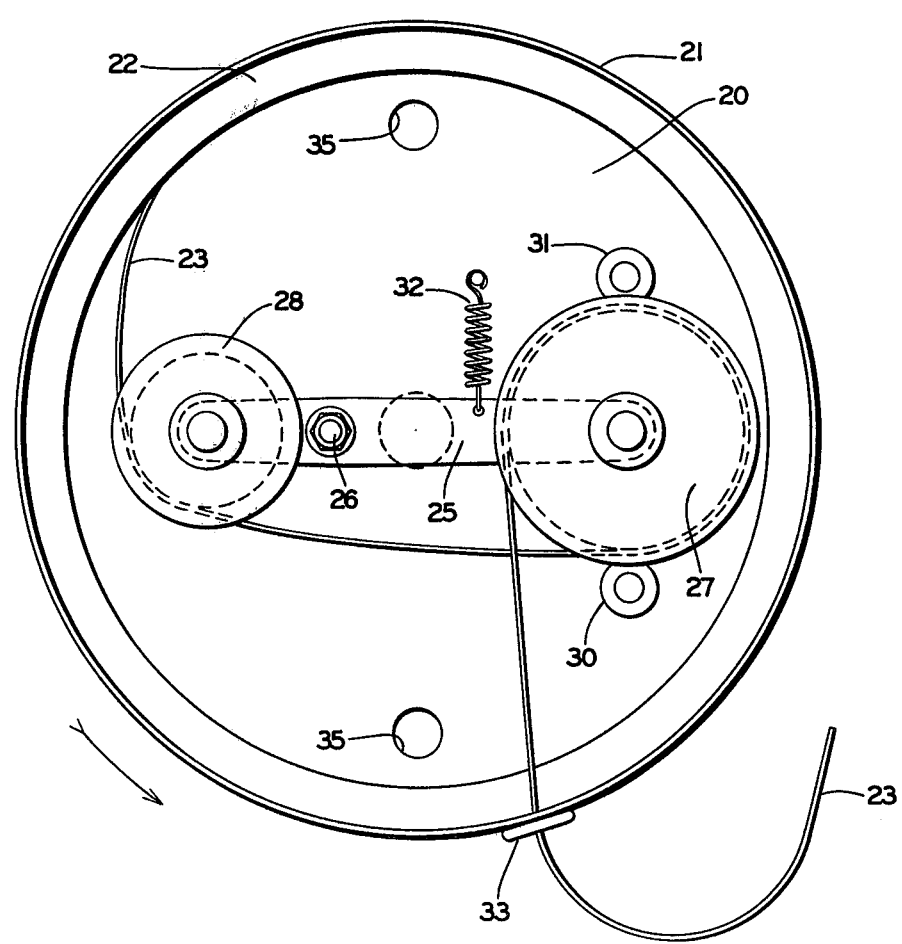
FIG. 3 is a view on a still larger scale of the cord adjusting mechanism as seen from below, with the protective safety shield removed.

A preferred form of cord supply mechanism is shown in FIG. 3, representing a bottom view of the parts exposed by removal of the safety shield 14.

The mechanism includes a plate 20 fastened to the end of shaft 13 by suitable fasteners (not shown) extending through openings 35, 35. The plate 20 has a cylindrical rim 21, within which may be placed an inwardly open endless channel 22, in which are packed a number of convolutions of single strand nylon cord 23 of about 2 mm diameter.

An arm 25 is mounted on pivot 26 fastened to plate 20. One end of arm 25 carries a freely rotating pulley 27 with a peripheral groove sized to receive one or more convolutions of cord 23. The other end of arm 25 carries a counterweight 28 also having a groove to guide cord 23, but functioning primarily as a counterbalance to pulley 27 and other parts distant from the axis, for preventing vibration of the machine.

Two identical blocks 30 and 31, solidly mounted on plate 20 on either side of pulley 27, are faced with a friction material such as rubber, shaped to engage cord 23 in the groove of pulley 27. They are spaced so as to permit pulley 27 to move a slight distance for engagement of one or another of the blocks 30 and 31 with cord 23. A spring 32 biases pulley 27 toward friction block 31 farthest away from the eye 33 which guides cord 23 as it passes through the outside.

In use, the end of cord 23 is drawn from channel 22, passed either directly into the groove of pulley 27, or first around the counterweight 28 as shown in the drawing and then around pulley 27, under both friction blocks 30 and 31. Finally, after one or two turns around the pulley 27, the cord passes out through eye 33.

This mechanism functions as follows. When the motor is started, turning the entire mechanism of FIG. 3 in the counterclockwise direction shown by the arrow, the inertia of the pulley 27 holds it, and cord 23, firmly against block 30, preventing the free end of cord 23 from being discharged outwardly by its centrifugal force. When the motor has reached its full speed, the inertia forces cease, and pulley 27 is urged in one direction by spring 32, and in the other direction by the centrifugal force of the free end of cord 23. Since spring 32 is weak, it is easily balanced or overcome by the centrifugal force of the cord, which causes cord to feed outward until the increase of its centrifugal force pulls pulley 27 toward block 30 with a sufficient force to snub the cord and prevent further outward feed of the cord. Additional outward forces, resulting from friction with vegetation being trimmed, are also resisted by this snubbing action.

The end of the cord then functions in its intended manner to cut grass or weeds, until wearing away of the end of the cord reduces its centrifugal force to an amount no longer sufficient to snub cord 23 effectively against block 30, whereupon the remaining centrifugal force draws more cord out until the snubbing effect terminates the cord feed again.

Since it is desirable for the operation of high speed rotational devices to be symmetrical, it may be preferred to have two cutter cords 23 diametrically opposite one another, as shown in FIGS. 1 and 2. This is accomplished in various possible ways, one of which is to provide a pair of the mechanisms shown in FIG. 3, and mount them face to face (one facing up and one facing down) with cord ends opposing one another, fastening them simultaneously to shaft 13 by quick-release latches passing through openings 35, 35 of both mechanisms. The assembly is then streamlined by a snap-on safety cover 14. In such an assembly identical base plates 20 can be used, differing only in that a mirror-image location for spring 32 must be provided, along with a mirror-image location for an exit eyelet 33 for the cord 23.

Alternative forms of mechanism may be provided, functioning in exactly the same way, but arranged somewhat differently.

Figure 4:
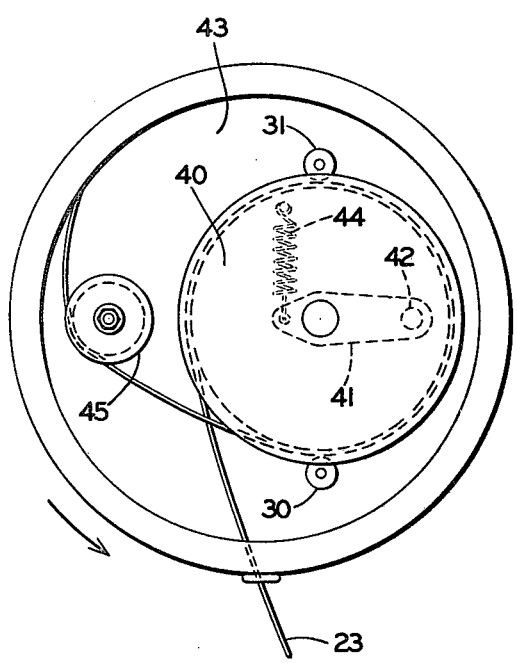
FIGS. 4 and 5 are somewhat smaller scale views of modified forms of the invention.

For example, if a greater snubbing force on cord 23 is desired, it can be obtained as shown in FIG. 4, by employing a pulley 40 of larger diameter, mounted on swing arm 41 on pivot 42 near the rim of the supporting plate 43, with spring 44 urging pulley 40 away from snubbing block 30. In this modification, a counterweight 45 of the proper mass to prevent unbalanced forces, is fastened directly to the supporting plate 43, instead of being placed on the swing arm. Friction blocks 30 and 31 function in exactly the same manner as before, except that the different location of the pivot for arm 41, and the greater diameter of the pulley, enhance the snubbing force on cord 23.

Figure 5:
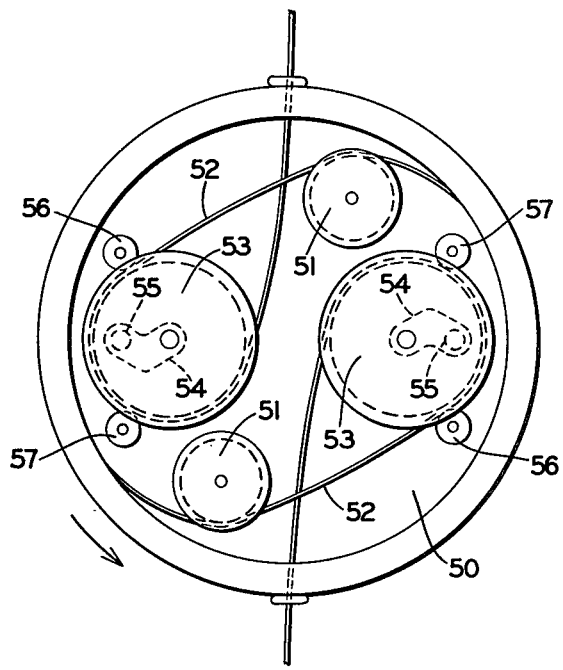

A more compact arrangement, shown in FIG. 5, provides for mounting two mechanisms for two cutting cords on a single base. Here base plate 50 supports two guide pulleys 51 diametrically opposite one another, for directing two cords 52 toward two diametrically opposing snubbing pulleys 53 mounted on swing arms 54 which in turn are on pivots 55 near the periphery of base plate 50. When the machine is operating, centrifugal force on the two separate cords 52 snubs the cords between pulleys 53 and snubbing blocks 56. The cords 52 are also snubbed at the same location by inertia forces during start up acceleration. The unsymmetrical shape of swing arms 54 provides centrifugal force at operating speed tending to draw pulleys 53 away from snubbing blocks 56, thus avoiding need for springs to perform this function. Additional snubbing blocks 57 limit motion of pulleys 53 away from snubbing blocks 56, and also provide for snubbing cords 52 during rapid deceleration.

Although the mechanisms described above will check some of the undesired tendencies toward cord displacement during the rapid acceleration and deceleration occurring during starting and stopping of the machine, additional restaints may be needed under some circumstances, to prevent unwanted feeding or retraction of cord.

Figure 6:
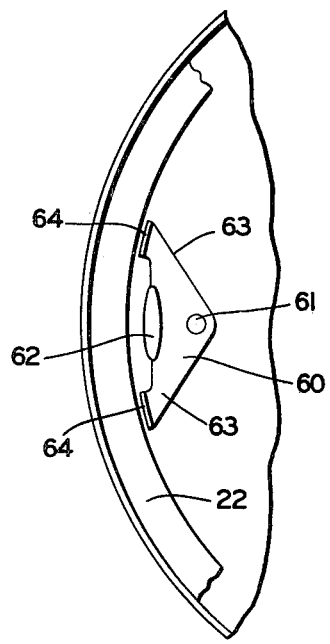
FIGS. 6 and 7 show acceleration neutralizing devices which may be added for more complete control of feeding of the cord.

One such situation involves relative rotational movement of convolutions of cord in the rim channel 22, which could result in unthreading the machine on startup, or in complete discharge of all of the cord supply on stopping. Such actions can be prevented by the inertia brake shown in FIG. 6.

This brake consists of a freely swinging brake element 60 on pivot 61. It has an inertia mass 62 radially outward from the pivot, and two arms 63 at angles of about 35° to 55° to the radius, each arm terminating in a friction pad 64.

During steady rotation the brake is inactive and is held essentially motionless by centrifugal force. On rapid acceleration or deceleration the mass 62 will tend to stay in its previous state, and will thereby swing on pivot 61, bringing one or the other of the friction pads 64 into forceful contact with the array of convolutions of cord in channel 22, to hold them against slippage. In performing this function, the device is self-energizing by reason of the angle between the motion of the cords and the supporting force from pivot 61 to pad 64.

Another such situation involves a tendency of snubbing pulley 27 to continue motionless on starting or to continue rotating on stopping. Although these tendencies will be opposed by friction at snubbing block 30 on starting and at snubbing block 31 on stopping, further control may be needed.

Figure 7:
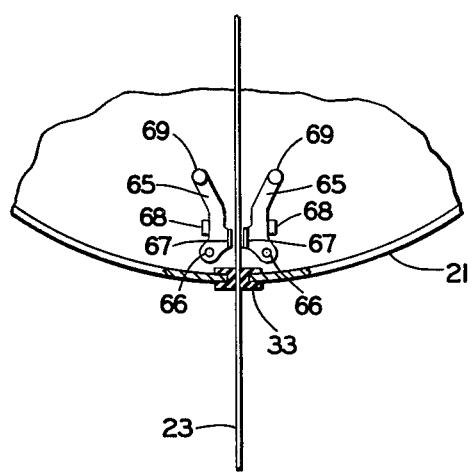

Such control can be provided by another inertia-operated friction brake shown in FIG. 7. This brake can be placed immediately inside the eye 33 through which cord 23 passes to the outside. It consists of a pair of generally radial arms 65, 65 one end of each being mounted on one of the pivots 66,66. Each arm 65, near the pivot 66, carries a friction pad 67, which may be faced with rubber, and each rests against a stop 68 so placed as just to allow free passage of cord 23 between friction pads 67,67. The free ends of arms 65 are provided with weights 69,69 and the arms are so shaped that centrifugal force on the weights holds the arms apart against stops 68,68. On rotary acceleration or deceleration the inertia of one or the other weight 69, magnified by the leverage of arm 65, presses friction pads 67,67 together to restrain motion of cord 23.

The automatic feed of cord provided by this invention greatly improves the whirling cord type of mowers by eliminating most down time for adjustment or renewal of cutting cord, and by providing nearly constant optimum conditions of use.

I claim:

1. A whirling cord type mower in which a long length of cord is stored in the rotating head of the mower and the free end of the cord passes from the head through an eye, characterized by presence of a snubbing device for the cord, the snubbing device having a fixed part on the rotating head and a moving part constrained to move toward and away from the fixed part, a guide way for training the cord between the fixed part and the moving part and in a loop around a portion of the moving part and thence essentially radially outward through the eye, with the loop so directed that tension of centrifugal force on the cord end presses the moving part toward the fixed part.

2. A mower as in claim 1, including means for biasing the moving part away from the fixed part with a force less than the maximum centrifugal force of the cord end.

3. A mower as in claim 2, in which the moving part of the snubbing device includes a grooved pulley around which the cord is passed and the fixed part includes a friction block fitting in the groove of the pulley to engage the cord.

4. A mower as in claim 3, in which the biasing means is a spring.

5. A mower as in claim 1, in which the moving part of the snubbing device is pivoted on an axis parallel to the axis of rotation of the rotating head of the mower and is so located with respect to its pivot axis that its inertia during starting acceleration increases the pressure between the two parts of the snubbng device.

6. A mower as in claim 5 in which the moving part of the snubbing device includes a grooved pulley around which the cord is passed and the fixed part includes a friction block fitting in the groove of the pulley to engage the cord, and the biasing means acting on the moving part is a spring.

7. A mower as in claim 1 including means loosely attached to a part of the rotational head for movement in response to rotational acceleration to engage, and restrain relative motion of, another part of the rotating head.

8. A mower as in claim 7 in which the means responsive to rotational acceleration are responsive to both positive and negative rotational acceleration.

9. A mower as in claim 1 having means responsive to positive and negative rotational acceleration for restraining the cord from moving in response to its centrifugal force.

10. A mower as in claim 6 having means responsive to positive and negative rotational acceleration for restraining the cord from moving in response to its centrifugal force.

* * * * *